United States Patent Office 2,742,398
Patented Apr. 17, 1956

2,742,398

METHOD OF REMOVING DEPOSITS OF WAX AND LIKE MATERIALS

Claude E. ZoBell, La Jolla, Calif., assignor to Texaco Development Corporation, New York, N. Y., a corporation of Delaware No Drawing. Application June 9, 1951, Serial No. 230,853

5 Claims. (Cl. 195—3)

This invention relates to the dissolution and removal of waxes such as paraffin wax and like deposits from oil wells, pipe lines for conveying hydrocarbons, and similar locations where such waxes tend to collect and either halt or materially impede circulation.

This application is a continuation-in-part of my application Serial No. 21,307, filed April 15, 1948, now abandoned.

The deposition and collection of waxes such as paraffin wax in pipe lines, oil wells and the like has been a material problem in the petroleum industry. Such deposits are most always in inaccessible locations or in such forms as very small pore plugs, the latter being prevalent in oil wells. Consequently the deposits are both difficult to reach and practically impossible to remove. While it is known that certain microorganisms will attack paraffin and effect its decomposition into readily removable products, such organisms are effective only under certain optimum conditions which are obviously impossible to secure and maintain in an oil well that may pass through strata of widely different compositions and temperatures or in a pipe line that may extend cross-country for many miles. For this and other reasons, their use in pipe lines, oil wells, etc. has been considered impractical.

An object of this invention is to provide a novel process wherein such microorganisms or enzymes thereof can be efficiently utilized in removing paraffin wax from pipe lines, oil wells and the like and inhibit further depositions of such wax therein.

Another object of the invention is the provision of a novel process for removing and inhibiting the formation of such paraffin deposits wherein the process, once initiated, is capable of continuing with a minimum of attention and little expense.

In its broader aspect, the present invention involves the simultaneous use of a number of different species of paraffin-consuming microorganisms or enzymes thereof, each species being capable of consuming paraffin under different conditions as to pH, temperature and other factors. More specifically, the invention involves the use of such microorganisms or enzymes thereof in combination with wax particles, such as flaked or granulated paraffin, whereby the ability of the microorganisms or enzymes thereof to adhere to the wax-coated surfaces of the pipe line or oil well is increased, the transplantation of the microorganisms being improved and the period of incubation, required for the microorganisms to manifest their wax-dissolving propensities, reduced. The invention contemplates the use of such microorganisms or their enzymes in the fluid being conveyed or otherwise handled, in the form of slugs or charges that may be fed periodically through a pipe line, or in the form of static charges to a pipe line when temporarily out of use.

As already stated, it is known that certain individual species of microorganisms and the enzymes thereof will assimilate paraffin wax. Typical of such microorganisms are species of Actinomyces, Nocardia, Mycobacterium, Pseudomonas, Micromonospora, Corynebacterium, Aspergillus, Penicillium, and Torula.

A number of such organisms are listed in the following table in the order in which they are considered most effective:

Nocardia (Proactinomyces) paraffinae
Nocardia corallina (Proactinomyces agrestis)
Mycobacterium rubrum
Mycobacterium hyalinum
Aspergillus versicolor
Aspergillus oryzae
Aspergillus flavus
Micrococcus paraffinae
Botrytis cinerea All the microorganisms in the foregoing table, as well as other species of these genera, assimilate paraffin wax best in the presence of free oxygen. A good many, however, will utilize paraffin slowly in the absence of free oxygen in media which provide oxygen from such compounds as nitrates, nitrites, carbohydrates, alcohols, etc.

Other microorganisms which are facultative aerobes i. e. grow best in the presence of free oxygen but will grow in appropriate medium in the absence of free oxygen, include Nocardia minima, Nocardia rubropertincta and Nocardia veridis. Microaerophilic organisms, which require at least a trace of free oxygen for their growth, may also be used in the invention.

Examples of a microorganism capable of assimilating paraffin in the total absence of free oxygen are species of Desulfovibrio, Sporovibrio and other sulfate reducers. Desulfovibrio hydrocarbonoclasticus and Desulfovibrio halohydrocarbonoclasticus are typical species of Desulfovibrio. Another such microorganism is Nocardia salmonicolor. Such sulfate reducing bacteria are preferred because of their ability to assimilate paraffin wax in the absence of free oxygen which is the usual circumstance in a pipe line or oil well. Moreover, the various varieties thereof are active over a total temperature range from near 0° to 85° C. and higher, although no one strain is active throughout this range. One strain may be limited to a maximum of 25° C.; another may exhibit maximum activity between 32° and 45° C. While the range of any one strain or variety may be narrow, a selected combination of the strains covers an exceedingly wide range. In addition, it is to be understood that most strains are susceptible to training or acclimatization to different temperatures. The microorganism can also be acclimatized to environmental factors such as salinity and osmotic pressure.

Typical microorganism with their operating temperature range, the preferred range being shown in brackets, are listed below:

Nocardia (Proactinomyces) paraffinae 5° to 35° C. (25° to 30° C.)
Nocardia corallina (Proactinomyces agrestis) (22° to 25° C.)
Nocardia minima (22° to 25° C.)
Nocardia rubropertincta (20° to 37° C.)
Nocardia veridis (25° to 30° C.)
Nocardia salmonicolor (35° to 40° C.)
Mycobacterium rubrum 20° to 58° C. (35° to 40° C.)
Mycobacterium hyalinum 25° to 45° C. (25° to 30° C.)
Aspergillus versicolor 25° to 35° C.
Aspergillus oryzae 25° to 35° C.
Aspergillus flavus 25° to 35° C.
Micrococcus paraffinae 26° to 37° C.
Botrytis cinerea 30° to 35° C.

The temperature range is not the only factor to be considered in selecting or developing the cultures to be used.

ther environmental factors must also be considered including salinity, oxygen tension, the types of hydrocarbons present, the possibilities of iron corrosion or biofouling, the material from which the conduit or well elements are made, etc. Obviously it would not be desirable to use an acid-producing strain in a concrete conduit or anaerobic strains in the presence of free oxygen. All of the above are obvious factors calling for culture selections equally as obvious, such selections being well within the skill of the microbiologist.

Assuming that the conditions as to the above factors in a given pipe line are known and that a selection of strains has been made to meet those conditions, the strains are dispersed in a suitable nutrient medium, usually of the mineral salt type. As is well known to the art, the compositions of such nutrients are selected in accordance with the requirements of the strain or strains used.

In the case of a pipe line, the inoculated medium may be charged directly into the line while the oil or other fluid is being conveyed thereby. The microorganisms are distributed throughout the line and brought into contact with the wax deposits. They function to dissolve and effect the removal of those deposits and tend to cling to the walls of the pipe line in a manner to be readily available for any new deposits of wax.

As a specific example of such a method, an inoculated microbiological nutrient medium can be prepared by inoculating a typical nutrient medium of the following composition with a number of different varieties of Desulfovibrio, Sporovibrio and other sulfate reducers such as Desulfovibrio hydrocarbonoclasticus, Desulfovibrio halohydrocarbonoclasticus, varieties thereof being selected as will be active over substantially the total temperature range to which the pipe line is subject. Other microorganisms such as Nocardia salmonicolor, Nocardia minima, Nocardia rubropertincta and Nocardia veridis may also be added.

| | | |
|---|---|---|
| NaCl | grams | 60 |
| Ca(C₃H₅O₃)₂ | do | 5.0 |
| CaCO₃ | do | 40.0 |
| CaSO₄.2H₂O | do | 50.0 |
| KH₂PO₄ | do | 0.2 |
| FeSO₄.7H₂O | do | 0.1 |
| (NH₄)₂HPO₄ | do | 0.1 |
| Sea water | ml | 1000 |

In the treatment of a pipe line through which oil is being conveyed, the inoculated medium can be metered into the oil at the point of entry or it can be metered into the line at some intermediate point. The quantity of inoculated medium may be as much as from 5 to 10% of the oil, it being understood that the medium will be diluted by the oil. By reason of certain of the bacteria being thigmotactic whereby they fix themselves to the internal surface of the pipe line as hereinafter explained, the dilution problem is not too great a disadvantage.

As an example of treating an oil well, the same inoculated medium as described above is charged down the casing at a rate of 5 to 6 gallons per day with the well being produced through the tubing. A lubricator can be used for this purpose, the medium being charged into the annulus defined by the tubing and casing. The charging may be continuous or by batch. When the well is being pumped off, the continuous method is preferred.

However in such cases, the concentration of the microorganisms or their enzymes is reduced. Hence it is preferred to charge the inoculated medium as an entity into the pipe line between charges of the fluid being conveyed thereby. The medium then moves as a substantially solid slug through the line, the microorganisms being brought into contact with the paraffin deposits.

In this method of treatment, the oil fed into the pipe line is interrupted, and inoculated medium of the above-described type is charged into the line in a quantity to fill 100 to 200 feet of the line. The feed of oil is resumed whereupon the inoculated medium moves as a substantially solid slug through the line, the thigmotactic bacteria adhereing to the surface thereof. At some convenient valving point along the line or at the terminus thereof, the flow of oil from the line is shut off and the slug of medium diverted and removed from the line. The approach of the slug to such a valving point or terminus can easily be determined by charging the slug with a small amount of a radioactive substance whereby the approach of the slug and its passage at any point can be determined by a Geiger-Mueller detector or the equivalent outside the pipe line. A second preferred method may be used when it is possible to shut off the pipe line temporarily or the pipe line is in intermittent use. In this case, the inoculated medium is charged to the empty line as between two valve controlled points and permitted to remain therein until it is desired to put the line in use again. The charge is then withdrawn and stored for use again since it is capable ordinarily of such reuse. If necessary, the nutrient constituents may be replenished and fresh cultures added.

To illustrate this particular method, Nocardia (Proactinomyces) paraffinnae, Nocardia corallina (Proactinomyces agrestis), Mycobacterium rubrum, Mycobacterium hyalinum, Aspergillus oryzae, Micrococcus paraffinae and Botrytis cinerea are charged to a nutrient medium of the following composition, the bacteria selected being of types that will be effective over the temperature range encountered.

| | | |
|---|---|---|
| Distilled water | ml | 1000 |
| NaH₂PO₄.H₂O | gram | 1 |
| K₂HPO₄ | do | 2 |
| NH₄NO₃ | do | 2 |
| MgCl₂.6H₂O | do | 0.25 |
| MnCl₂.4H₂O | do | 0.01 |
| CaCO₃ | do | 0.01 |
| FeCl₂ | do | 0.01 |

The addition of certain ions such as copper, mercury, zinc, bismuth and iodine to the medium in trace amounts may stimulate the activity of the microorganisms.

Assuming the pipe line is shut off and substantially drained between two valved points, the inoculated medium is charged to the empty section in a volume to substantially fill the section and air or any oxygen-containing medium passed through the line from one shut-off point to the other. This is continued as long as is necessary to clean the line or as long as the line can be held inactive as respects the transport of oil. The inoculated medium is then withdrawn and stored for reuse or discarded as desired. Since some of the bacteria such as Proactinomyces paraffinae are thigmotactic, they will be usually retained in the line in substantial quantity to continue their metabolism.

Similar methods can be practiced in the cleaning of oil wells, the medium being charged to the well and withdrawn with the oil. Or the well may be charged with the medium and closed until the well is cleaned. In the case of wells being dug, the medium may be mixed with the drilling mud and distributed throughout the well.

So-called "attachment or stalked bacteria", more recently termed "thigmotactic bacteria" are preferred because of their ability to attach and fix themselves to surfaces such as the interior surfaces of a pipe line, oil tank or oil well. Desulfovibrio hydrocarbonoclasticus is typical of such an anaerobe and Proactinomyces paraffinae of such an aerobe.

The term "microorganism" as used herein is intended to include bacteria and their enzymes as well as fungi. Certain fungi such as Botrytis cinerea, an aerobe, is capable of perforating and dissolving paraffin wax. The vegetative hyphae of this fungus are capable of perforating paraffin wax to a depth of ½ inch or more. Such fungi are capable of use only in the presence of free oxygen.

In most instances, it is preferred to charge the inoculated medium with fine wax particles such as flaked or granulated paraffin, although the procedures outlined in the foregoing examples are satisfactory. Such particles are sufficiently fine to stay in suspension in the nutrient medium and function as mechanical carriers for the microorganisms. By reason of their waxy nature, they tend to cohere to the wax deposits in the pipe line or oil well, thus bettering the transplantation of the organism and shortening the incubation period.

It is to be understood that in some cases as in a short section of a pipe line or in some oil wells, the environment may remain substantially constant and be suited to one particular species or variety of wax-consuming microorganism. In such case, it may be necessary to use only single species or variety rather than a plurality thereof.

From the above, it is believed evident that the present process provides a simple and inexpensive method of removing wax from locations hitherto considered inaccessible. Such locations are found in pipe lines, oil wells, storage tanks and other places. By reason of the tendency of the microorganisms, particularly when associated with paraffin in small particles or when thigmotactic varieties are used, to adhere to the interior surfaces of the pipe lines and other locations, the process continues to be effective in inhibiting further deposits of paraffin.

While reference has been made herein specifically to a wax such as paraffin wax, it is to be understood that the invention is applicable to deposits of any material susceptible to attack by microorganisms.

Obviously many modifications and variations of the invention, as hereinbefore set forth, may be made without departing from the spirit and scope thereof, and therefore only such limitations should be imposed as are indicated in the appended claims.

I claim:

1. A method of dissolving, removing, and inhibiting deposition of wax and like materials in pipe lines for hydrocarbons, oil wells and similar locations comprising the step of intermittently contacting said wax deposits with a microbiological nutrient medium having relatively fine particles of wax suspended therein and inoculated with a plurality of different species of wax-consuming microorganisms, each species being selected in accordance with its environmental characteristics so that one or more species is effective on said wax deposits throughout substantially the entire range of changes in environmental characteristics in said locations.

2. A method of dissolving, removing and inhibiting deposition of wax and like materials in pipe lines for hydrocarbons wherein there is normally a continuous flow of fluid therethrough comprising the steps of intermittently substituting a charge of a microbiolgcial nutrient medium for said fluid, said medium having relatively fine particles of wax suspended therein and inoculated with a plurality of different species of wax-consuming microorganisms, each species being selected in accordance with its environmental characteristics so that one or more species is effective on said wax throughout substantially the entire range of changes in environmental characteristics in said locations.

3. A method of dissolving, removing, and inhibiting deposition of wax and like materials in a pipe line for hydrocarbons comprising the steps of periodically discharging said line of hydrocarbons, charging said line with microbiological nutrient medium having relatively fine particles of wax suspended therein and inoculated with a plurality of different species of wax-consuming microorganisms, each species being selected in accordance with its environmental characteristics so that one or more species is effective on said wax throughout substantially the entire range of charges in environmental characteristics in said line, discharging said nutrient medium, and recharging said line with hydrocarbons.

4. A method of dissolving, removing, and inhibiting deposition of wax and like materials in pipe lines for hydrocarbons, oil wells and similar locations comprising the step of intermittently contacting said wax deposits with a microbiological nutrient medium inoculated with a plurality of different species of wax-consuming microorganisms, at least one of which is *Proactinomyces paraffinae*, a thigmotactic microorganism, each species being selected in accordance with its environmental characteristics so that one or more species is effective on said wax deposits throughout substantially the entire range of changes in environmental characteristics in said locations.

5. A method of dissolving, removing and inhibiting deposition of wax and like materials in pipe lines for hydrocarbons wherein there is normally a continuous flow of fluid therethrough comprising the steps of intermittently substituting a charge of a microbiological nutrient medium for said fluid, said medium being inoculated with a plurality of different species of wax-consuming microorganisms, at least one of which is *Proactinomyces paraffinae*, a thigmotactic microorganism, each species being selected in accordance with its environmental characteristics so that one or more species is effective on the wax deposits throughout substantially the entire range of changes in environmental characteristics in said locations.

References Cited in the file of this patent

UNITED STATES PATENTS

| 1,998,756 | Grebe et al. | Apr. 23, 1935 |
| 2,259,419 | Hefley | Oct. 14, 1941 |
| 2,413,278 | ZoBell | Dec. 24, 1946 |